(12) United States Patent
Kauss (10) Patent No.: US 6,658,843 B1
(45) Date of Patent: Dec. 9, 2003

(54) HYDRAULIC CONTROL ARRANGEMENT FOR THE DEMAND-FEED REGULATED (LOAD-SENSING-REGULATED) HYDRAULIC FLUID SUPPLY TO PREFERABLY SEVERAL HYDRAULIC CONSUMERS

(75) Inventor: Wolfgang Kauss, Francheville (FR)

(73) Assignee: Bosch Rexroth AG, Lohr/Main (DE)

( * ) Notice: Subject to any disclaimer, the term of this patent is extended or adjusted under 35 U.S.C. 154(b) by 23 days.

(21) Appl. No.: 10/031,805

(22) PCT Filed: Jul. 28, 2000

(86) PCT No.: PCT/EP00/07341

§ 371 (c)(1),
(2), (4) Date: Jun. 24, 2002

(87) PCT Pub. No.: WO01/11245

PCT Pub. Date: Feb. 15, 2001

(30) Foreign Application Priority Data

Aug. 6, 1999 (DE) .......................................... 199 37 224

(51) Int. Cl.[7] ............................................. F16D 31/02
(52) U.S. Cl. ......................................... 60/468; 60/421
(58) Field of Search .......................... 60/468, 421, 429; 417/287

(56) References Cited

U.S. PATENT DOCUMENTS

| 4,044,786 A | 8/1977 | Yip |
| 4,838,756 A | 6/1989 | Johnson et al. |
| 5,540,050 A | 7/1996 | Krupowicz |

FOREIGN PATENT DOCUMENTS

| DE | 3433896 | 3/1985 |
| DE | 3422205 | 12/1985 |
| DE | 4129508 | 3/1993 |
| DE | 19703997 | 8/1998 |
| DE | 19714141 | 10/1998 |
| EP | 0164603 | 12/1985 |
| EP | 0458050 | 11/1991 |
| EP | 0566449 | 12/1995 |

OTHER PUBLICATIONS

Patent Abstracts of Japan vol. 010, No. 115 (M–474) Apr. 30, 1986 & & JP 60 245807 A (Nitsusei Jiyushi Kogyo) Dec. 5, 1985.
Patent Abstracts of Japan vol. 010, No. 167 (M–488) Jun. 13, 1986 & JP 61 017703 A (Toshiba Kikai) Jan. 25, 1986.

*Primary Examiner*—Edward K. Look
*Assistant Examiner*—Michael Leslie
(74) *Attorney, Agent, or Firm*—Martin A. Farber (57) ABSTRACT

A hydraulic control arrangement which is provided for the demand-feed-regulated supply of pressure medium to preferably a plurality of hydraulic consumers by proportionally adjustable directional valves. There are hydraulic pumps by which pressure medium can be conveyed in a quantity corresponding to the demand into a common inflow line leading to the directional valves. A first demand-feed regulator is assigned to the first hydraulic pump and a second demand-feed regulator to the second hydraulic pump. The two demand-feed regulators are capable of being acted upon, with the effect of increasing the pressure medium quantity discharged into the inflow line by the corresponding hydraulic pump, by a spring and, on a first active surface, by the pressure in a load-signaling line and, with the effect of reducing the pressure medium quantity discharged into the inflow line by the corresponding hydraulic pump, on a second active surface, by a pump pressure. Moreover, a nonreturn valve opening toward the inflow line is arranged between the first hydraulic pump and said inflow line. Either both hydraulic pumps or only the second hydraulic pump conveys pressure medium to the inflow line. In order to be more flexible here, a nonreturn valve opening toward the inflow line is also arranged between the second hydraulic pump and the latter. There are also members by which action of force on the demand-feed regulators can be changed that the hydraulic consumers can be supplied with pressure medium both solely by the first hydraulic pump and solely by the second hydraulic pump.

15 Claims, 6 Drawing Sheets

HYDRAULIC CONTROL ARRANGEMENT FOR THE DEMAND-FEED REGULATED (LOAD-SENSING-REGULATED) HYDRAULIC FLUID SUPPLY TO PREFERABLY SEVERAL HYDRAULIC CONSUMERS

FIELD AND BACKGROUND OF THE INVENTION

The invention relates to a hydraulic control arrangement, by means of which preferably a plurality of hydraulic consumers are supplied with pressure medium (hydraulic fluid) in a demand-feed-regulated manner. Such a hydraulic control arrangement is used, in particular, in mobile working machines, such as, for example, dredger loaders.

A hydraulic control arrangement with demand-feed regulation or on the load-sensing principle is known from EP 0 566 449 B1. In this known control arrangement, a variable-displacement pump is set as a function of the highest load pressure of the actuated hydraulic consumers, in each case in such a way that the pump pressure is above the highest load pressure by the amount of a specific pressure difference. The pressure medium flows to the hydraulic consumers via adjustable metering diaphragms which are arranged between an inflow line, into which the pressure medium is conveyed by the variable-displacement pump, and the hydraulic consumers. What is achieved by means of pressure compensators located downstream of the metering diaphragms is that, when a sufficient quantity of pressure medium is delivered by the variable-displacement pump, there is a specific pressure difference across the metering diaphragms, irrespective of the load pressures of the hydraulic consumers, so that the pressure medium quantity flowing to a hydraulic consumer then depends only on the opening cross section of the respective metering diaphragm. When the metering diaphragm is opened further, a greater pressure medium quantity must flow across it in order to generate the specific pressure difference. The variable-displacement pump is in each case adjusted in such a way that it delivers the required pressure medium quantity. This is also therefore also referred to as demand-feed regulation.

The pressure compensators located downstream of the metering diaphragms are acted upon in the opening direction by the pressure downstream of the respective metering diaphragm and in the closing direction by a control pressure which prevails in a rear control space and which normally corresponds to the highest load pressure of all the hydraulic consumers supplied by the same hydraulic pump. When, during a simultaneous actuation of a plurality of hydraulic consumers, the metering diaphragms are opened to an extent such that the pressure medium quantity delivered by the hydraulic pump adjusted to the limit is smaller than the total pressure medium quantity required, the pressure medium quantities flowing to the individual hydraulic consumers are reduced in the same proportion, regardless of the respective load pressure of the hydraulic consumers. This is therefore referred to as control with load-independent throughflow distribution (LUDV control). Hydraulic consumers activated in this way are known, in brief, as LUDV consumers. Since, in LUDV control, the highest load pressure is also sensed and, by a variation in the pressure medium quantity required, an inflow pressure which is above the highest load pressure by the amount of a specific pressure difference is generated by the hydraulic pump, LUDV control is a special case of load-sensing control (LS control).

For a plurality of hydraulic consumers, to which pressure medium flows in each case via a metering diaphragm with an upstream pressure compensator, which is acted upon in the closing direction only by the pressure upstream of the metering diaphragm and in the opening direction only by the load pressure of the respective hydraulic consumer and by a compression spring, there is no load-independent throughflow distribution. There is a straightforward LS control and LS consumer. Such a control is known, for example, from DE 197 14 141 A1. Here, when a plurality of hydraulic consumers are actuated simultaneously and there is not a sufficient pressure medium quantity delivered by the variable-displacement pump, only the pressure medium quantity flowing to the hydraulic consumer having the highest load pressure is reduced.

DE 197 03 997 A1 discloses a hydraulic control arrangement which includes a variable-displacement pump supplying pressure medium to a plurality of LUDV consumers and to one LS consumer. The LS consumer is a hydraulic steering system in which pressure medium preferentially has to be supplied. This priority of the hydraulic steering system in relation to the LUDV consumers is achieved by means of a priority valve which has a first junction, connected to a portion of the inflow line upstream of the metering diaphragm assigned to the steering system, and a second junction, connected to the load-signaling line, and a valve member of which is acted upon in the opening direction of the connection between the first junction and the second junction by the load pressure of the steering system and the force of a compression spring and in the closing direction of the connection between the first junction and the second junction by the pressure prevailing in the first junction. When the load pressure of the steering system is higher than the load pressure of an LUDV consumer actuated in parallel with this and a variable-displacement pump conveys sufficient pressure medium for all the actuated hydraulic consumers (saturation situation), the priority valve causes so much pressure medium to flow out of the inflow line into the load-signaling line that a pressure dependent on the height of the load pressure of the steering system prevails in the latter and a pressure which is above the steering system pressure by the amount of a specific pressure difference prevails in the inflow line. When so much pressure medium is demanded that the variable-displacement pump is adjusted as far as the maximum stroke volume (undersaturation situation), then the priority valve increases the pressure in the load-signaling line to an extent such that, by a more pronounced throttling of the pressure medium stream, the LUDV pressure compensators lower the pressure difference across the LUDV metering diaphragms to an extent such that the pressure in the inflow line maintains the same level as in the saturation situation and the pressure difference across the LS metering diaphragm is exactly the same as in the saturation situation.

A control arrangement with demand-feed regulation can be implemented not only with a variable-displacement pump having an LS pump-regulating valve, but also with a fixed-displacement pump and an LS-controlled bypass pressure compensator, via which pressure medium conveyed by the hydraulic pump and not required by the hydraulic consumers flows back to a tank. In this case, however, the losses of nonutilizable energy are higher than when the variable-displacement pump is used.

Figure 4:
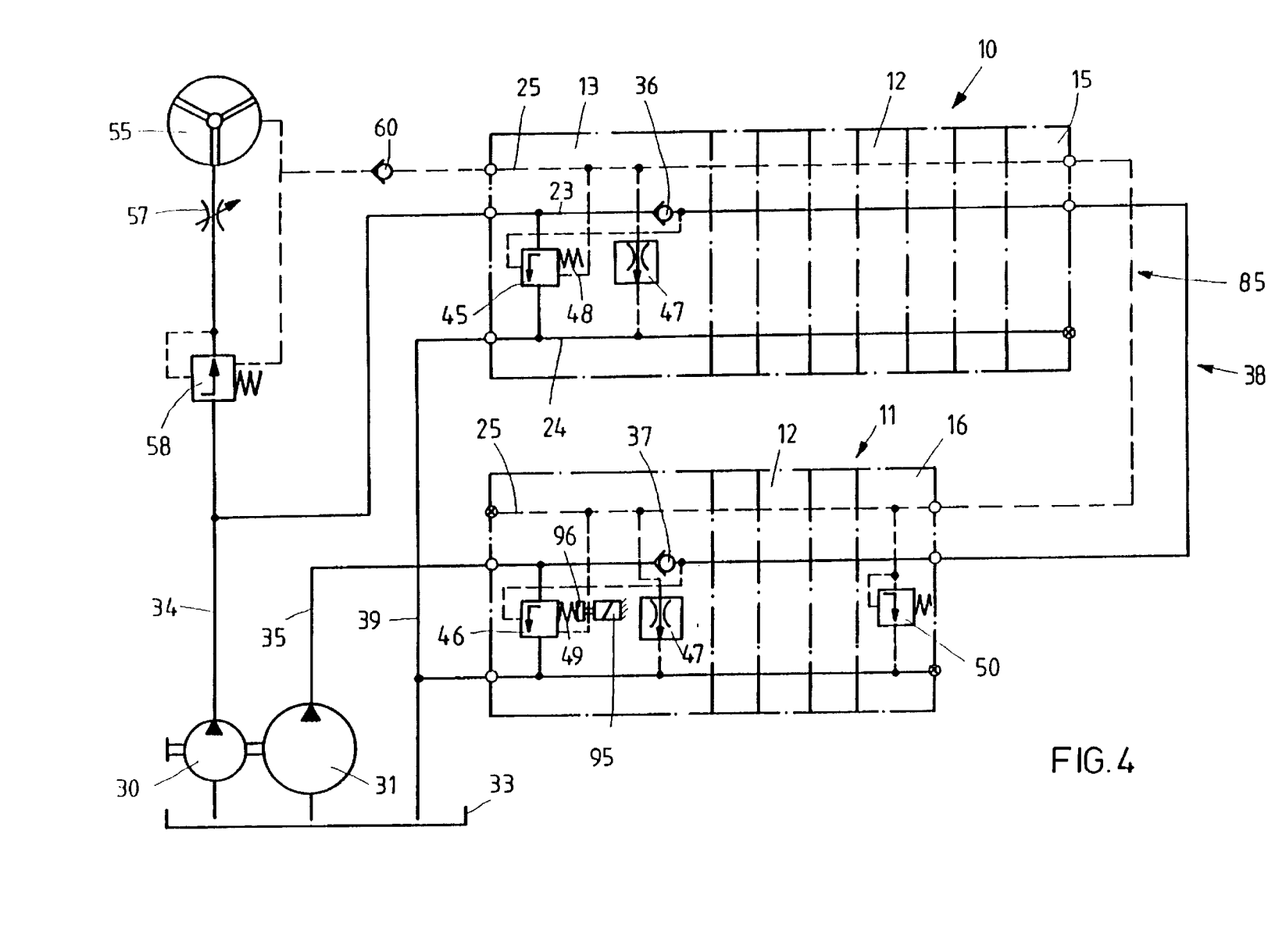
FIG. 4 shows a fourth exemplary embodiment in which, to select the conveying hydraulic pump, the prestress of the regulating spring of the one bypass pressure compensator can be changed.

A hydraulic control arrangement is known from DE 34 22 205 A1, FIG. 4. In this, the two hydraulic pumps are fixed-displacement pumps and the two demand-feed regulators are bypass pressure compensators. An inflow line leads from the pressure outlet of the second hydraulic pump to a control block, while the first hydraulic pump conveys into the inflow line via a nonreturn valve. The two pressure compensators are acted upon in the closing direction by the pressure in the load-signaling line and a compression spring and in the opening direction by the pressure in the inflow line. By causing the compression spring to exert on the second pressure compensator assigned to the second hydraulic pump a force which corresponds to a somewhat greater pressure difference than the compression spring on the first pressure compensator assigned to the first hydraulic pump, in the case of a low demand for pressure medium, only the second hydraulic pump conveys pressure medium to the control block, while the pressure medium quantity conveyed by the first hydraulic pump flows back, pressureless, to the tank via the first pressure compensator. When the demand for pressure medium of the simultaneously actuated hydraulic consumers exceeds the conveyed quantity of the second hydraulic pump, the pressure in the inflow line falls below a value determined by the highest load pressure and by the pressure difference set at the second pressure compensator. The second pressure compensator closes completely. The first pressure compensator assumes a regulating position and ensures that the pressure in the inflow line is above the highest load pressure by the amount of the pressure difference set at the first pressure compensator. In the known control arrangement, the two hydraulic pumps and the two bypass pressure compensators could also be readily replaced by two variable-displacement pumps with LS pump-regulating valves set to different pressure differences.

Irrespective of whether fixed-displacement pumps or variable-displacement pumps are used, the known hydraulic control arrangement has a disadvantage in as much as, after an appropriate setting of the pressure compensators or of the pump-regulating valves, it is fixed as to which of the two hydraulic pumps first alone supplies pressure medium to the hydraulic consumers and which is connected when the demand for pressure medium exceeds the (maximum) pressure medium quantity conveyed by the second hydraulic pump. This is a disadvantage, in particular, when the hydraulic pumps are of different size in respect of the conveyed quantity or when a further hydraulic consumer, for example a steering system, can be supplied with pressure medium solely by one hydraulic pump.

SUMMARY OF THE INVENTION

The object on which the invention is based is, therefore, to develop further a hydraulic control arrangement with two hydraulic pumps and with other features mentioned-above, in such a way that a more flexible selection of the hydraulic pump conveying under pressure, in terms of the demand for pressure medium of the hydraulic consumers, is possible in a simple way.

The intended object is achieved, according to the invention, in that a nonreturn valve opening toward the inflow line is also arranged between the second hydraulic pump and said inflow line, and in that there are means by which the action of force upon the demand-feed regulator can be changed in such a way that the hydraulic consumers can be supplied with pressure medium both solely by the first hydraulic pump and solely by the second hydraulic pump. According to the invention, therefore, the desired flexibility is acquired in a very simple way by a change in the action of force upon the regulating pistons of the demand-feed regulators.

Thus, according to other features of the invention, a first advantageous possibility for influencing the demand-feed regulator is for the spring on at least one demand-feed regulator to be adjustable in such a way that the pressure difference corresponding to the force of the springs is, on the one hand, greater and, on the other hand, smaller on the first demand-feed regulator than on the second demand-feed regulator. Preferably, in this case, therefore, the pressure difference determined by the spring on the one demand-feed regulator in a first state is smaller than the pressure difference on the other demand-feed regulator. The spring, then, can be prestressed to a greater extent and thereby brought into a second state, in which the pressure difference determined by it is greater than the pressure difference on the other demand-feed regulator. It is also conceivable, however, to prestress the two springs approximately to the same extent in a state of rest and to stress one spring or the other to a greater extent in order to supply pressure medium to the hydraulic consumers by means of only one or the other hydraulic pump.

According to still other features of the invention, a second advantageous possibility for influencing the demand-feed regulator is that a control space on the second active surface of the second demand-feed regulator is connected to the inflow line, that the load-signaling line can be shut off relative to the first demand-feed regulator by means of a switching valve, that, in the blocking position of the switching valve, the first active surface of the first demand-feed regulator can be relieved of pressure, and that the spring of the first demand-feed regulator is set at a higher pressure difference than the spring of the second demand-feed regulator. A slightly different setting of the demand-feed regulators and only one switching valve is necessary here.

According to yet other features of the invention, a third advantageous possibility for influencing the demand-feed regulators is that the load-signaling line can be shut off relative to the first demand-feed regulator by means of a first switching valve and relative to the second demand-feed regulator by means of a second switching valve, and that, in the blocking position of one switching valve, the first active surface of the corresponding demand-feed regulator can be relieved of pressure. In this case, as compared with conventional control arrangements, there is no need for any changes to the demand-feed regulators. Moreover, the two demand-feed regulators can be set at the same pressure differences between the pump pressure and the highest load pressure, so that, in situations where only one hydraulic pump or only the other hydraulic pump supplies pressure medium to the hydraulic consumers, there is the same pressure difference across the metering diaphragms.

If a control space on the second active surface of a demand-feed regulator is connected, upstream of the corresponding nonreturn valve, to a flow path running between the corresponding hydraulic pump and the nonreturn valve, then the control space and a working junction of a demand-feed regulator can be connected to one another in a simple way. However, in this case, when one hydraulic pump is not being used, the demand-feed regulator sets a low-level pump pressure, so that, even in the case of a variable-displacement pump, some losses of nonutilizable energy still occur. It seems more favorable, therefore, in terms of the energy balance, if, as specified in patent claim 6, a control space on the second active surface of a demand-feed regulator is connected to the inflow line. This is because the demand-feed regulator is then held, by a pressure which prevails in the inflow line and is higher than the pressure equivalent to the force of the spring, in an open end position in which the pressure medium quantity conveyed by a fixed-displacement pump can flow out, pressureless, to the tank or a variable-displacement pump is adjusted completely in the direction of zero conveyed quantity.

According to another feature of the invention, the two hydraulic pumps are of different size in terms of the stroke volume, so that good adaptation to the operating state and to the pressure medium demand dependent on this is possible.

According to yet another feature of the invention, there may be a further hydraulic consumer, to which pressure medium can be supplied only by the one hydraulic pump. If this further hydraulic consumer is an LS consumer which is to have priority in the supply of pressure medium, for example a hydraulic steering system, then, if the other hydraulic consumers are LUDV consumers, priority may be ensured by a prestressing of the LUDV pressure compensators of the other consumers which exceeds the amount necessary per se. In particular, in the design according to further features of the invention, the activation of the preferred consumer is not influenced by the other consumers. However, the prestressed closing springs of the LUDV pressure compensators cause energy losses. Even though a relatively high outlay in terms of apparatus is involved, a design according to additional features of the invention therefore seems more favorable in terms of the energy balance, whereby, in an undersaturation situation, the pressure on the rear side of the LUDV pressure compensators is increased beyond the highest load pressure and consequently the pressure difference and the pressure medium flow across the second metering diaphragms are reduced.

The hydraulic pumps may be those with a constant stroke volume, to which a bypass pressure compensator is assigned, or else variable-displacement pumps.

BRIEF DESCRIPTION OF THE DRAWINGS

Several exemplary embodiments, set up as a circuit, of a hydraulic control arrangement according to the invention and an LUDV directional valve which can be used in a control arrangement according to the invention are illustrated in the drawings. The invention is explained in more detail with reference to the figures of these drawings in which.

DETAILED DESCRIPTION OF THE PREFERRED EMBODIMENT

Figure 5:
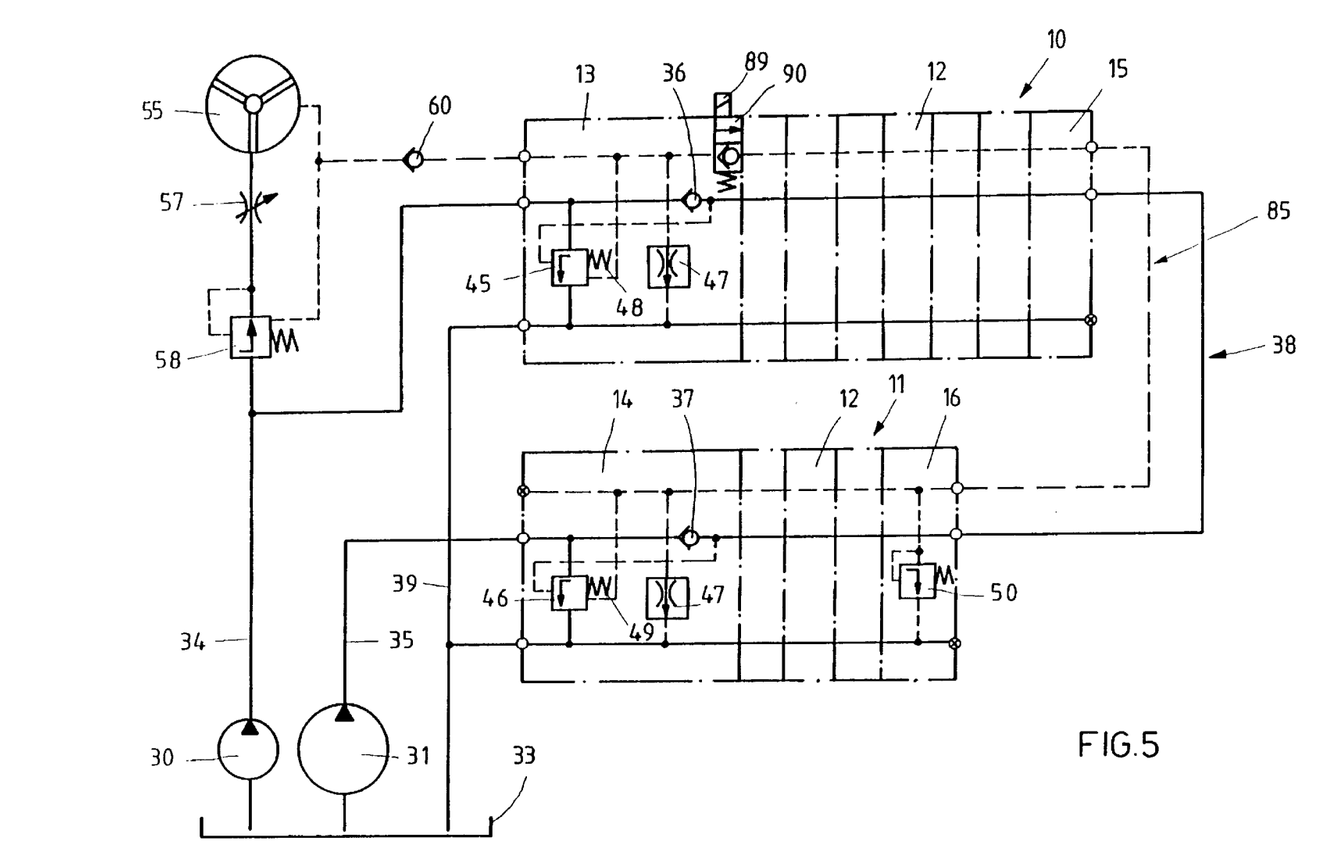
FIG. 5 shows a fifth exemplary embodiment in which, to select the conveying hydraulic pump, the regulating springs of the two bypass pressure compensators are prestressed to a different extent and the bypass pressure compensator having the spring prestressed to a greater extent is assigned a switching valve by which the one control side of this bypass pressure compensator can be shut off relative to the load-signaling line of the LUDV consumers.
Figure 6:
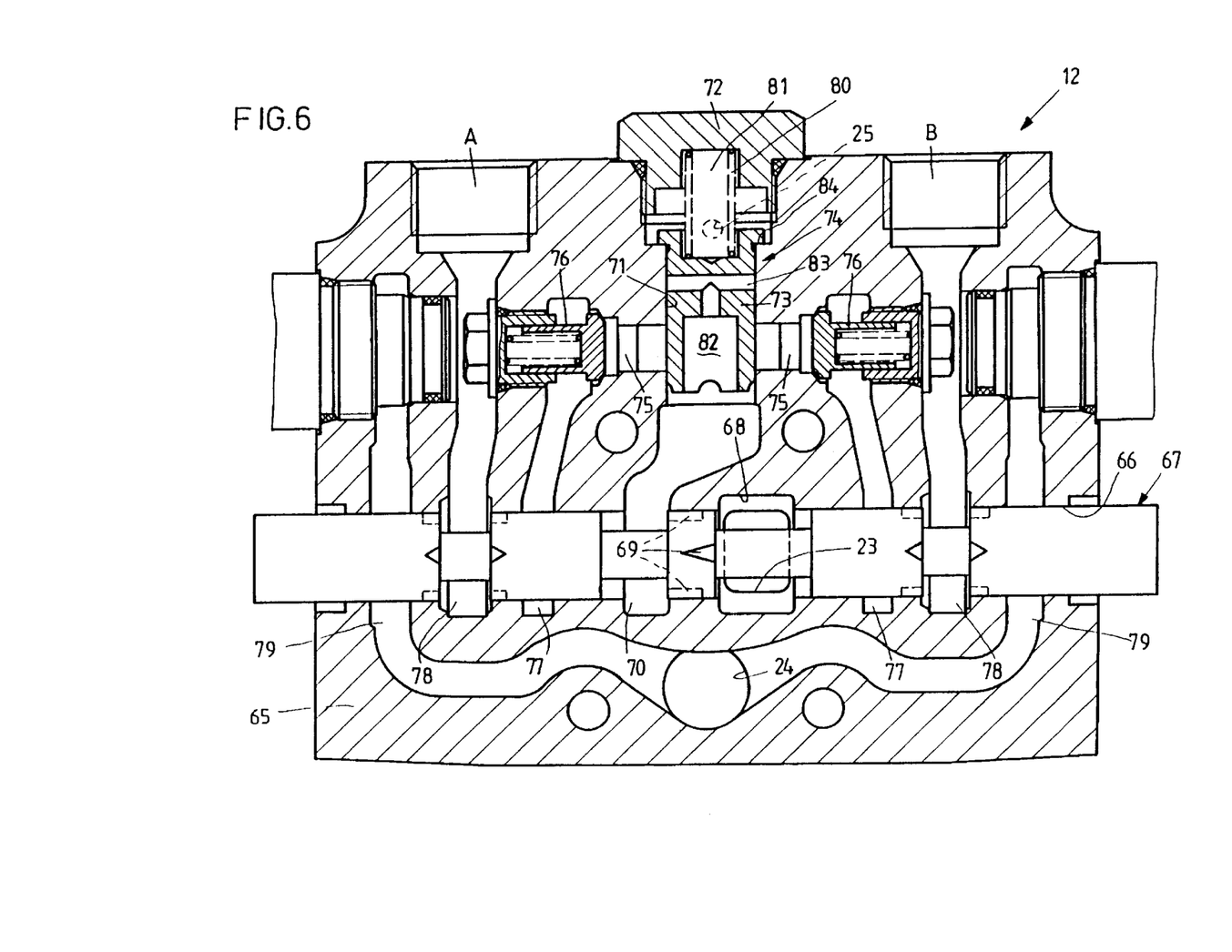
FIG. 6 shows a longitudinal section through an LUDV directional valve which can be used in the control arrangements according to FIGS. 1 to 5.

The hydraulic control arrangements shown in FIGS. 1 to 5 comprise two LUDV control blocks 10 and 11 in a disk-type form of construction, which each comprise a plurality of LUDV directional valves 12, one of which is illustrated in FIG. 6, an inlet disk 13 and 14 and an end disk 15 and 16. A hydraulic consumer, for example a double-acting hydraulic cylinder, can be controlled in terms of speed of movement and direction of movement by means of each directional valve 12. Each inlet disk 13 and 14 possesses a pump junction 17 and 18, a tank junction 19 and 20 and a control junction 21 and 22, the control junction 22 of the inlet disk 14 of the control block 11 being closed by means of a plug. From said junctions emanate ducts 23, 24 and 25 which run perpendicularly to the disk planes completely through the respective control block 10 and 11 as far as that side face of the end disk 15 and 16 which faces away from the directional valves 12. There, the tank duct 24 emanating from the tank junction 19 and 20 is closed by means of a plug. The ducts 23 are fluidically connected to one another by means of a line 26 running from one end disk 15 to the other end disk 16 and the ducts 25 are fluidically connected to one another by means of a line 27 running between the two end disks. According to the invention, the hydraulic control arrangements shown in FIGS. 1 to 5 have two hydraulic pumps 30 and 31 which are fixed-displacement pumps and of which the first hydraulic pump 30 has a smaller stroke volume than the second hydraulic pump 31. The hydraulic pump 30 discharges pressure medium, which it sucks in from a tank 33, into a pump line 34 which leads to the pump junction 17 of the control block 10. The second hydraulic pump 31 discharges pressure medium, which it likewise sucks in from the tank 33, into a pump line 35 which leads to the pump junction 18 of the control block 11. Pressure medium conveyed by the hydraulic pump 30 can flow from the pump junction 17, via a nonreturn valve 36 built into the duct 23 within the inlet disk 13, to the directional valves 12 of the control block 10 and, via the line 26, also to the directional valves 12 of the control block 11. Conversely, pressure medium conveyed by the hydraulic pump 31 can flow, via the pump junction 18 of the control block 11 and via a further nonreturn valve 37 built into the inlet disk 14 of this control block, to the directional valves 12 of the control block 11 and, via the line 26 also to the directional valves 12 of the control block 10. The respective portions of the ducts 23 downstream of the nonreturn valves 36 and 37 and also the line 26 thus form an inflow line 38 which is common to all the directional valves 12 of the two control blocks 10 and 11 and into which pressure medium can be conveyed by the two hydraulic pumps 30 and 31. The portions of the ducts 25 in the directional valves 12 and in the end disks 15 and 16 and also the line 27 may be designated as a load-signaling line 85.

The tank junctions 19 and 20 of the two control blocks 10 and 11 are fluidically connected to the tank 33 via tank lines 39.

In all the exemplary embodiments according to FIGS. 1 to 5, the inlet disks 13 and 14 contain, in addition to a nonreturn valve 36 and 37, a bypass pressure compensator 45 and 46, which is connected with its working junctions between the ducts 23 and 24, and a small-stream controller 47 which is located between the respective duct 25 and the respective duct 24 and limits a pressure medium quantity flowing out of the duct 25 into the duct 24. The regulating piston of each bypass pressure compensator 45 and 46 is acted upon in the closing direction of the pressure compensator by a pressure which prevails within a portion of the respective duct 25 running in the inlet disk. Moreover, a compression spring 48 (pressure compensator 45) or a compression spring 49 (pressure compensator 46) acts in the closing direction. In each case the pressure at the pump junctions 17 and 18, that is to say the pressure upstream of the nonreturn valves 36 and 37 (FIGS. 1 and 3) or the pressure downstream of the nonreturn valves 36 and 37, that is to say the pressure in the common inflow line 38 (FIGS. 2, 4 and 5), acts in the opening direction of the pressure compensators 45 and 46.

As already mentioned, the end disks 15 and 16 of the two control blocks serve in the same way for making it possible to close the ducts 24 and connect the lines 26 and 27 to the ducts 23 and 25. Furthermore, a pressure relief valve SO is accommodated in the end disk 16 of the control block 11, said pressure relief valve being located between the duct 25 and the tank duct 24 and limiting the pressure in the duct 25 to a maximum value.

The hydraulic consumers capable of being activated by the LUDV directional valves 12 are designated as LUDV consumers. Furthermore, the control arrangements shown comprise, as a further hydraulic consumer, a hydraulic steering system 55 which is indicated by a stylized steering wheel in the figures. This hydraulic consumer can be supplied with pressure medium solely by the first hydraulic pump 30. For this purpose, a supply line 56 emanates from the pump line 34 extending between the hydraulic pump 30 and the pump junction 17 of the control block 10. The hydraulic steering system 55 is what is known as an LS consumer, to which pressure medium can be supplied via a directional valve, not illustrated in any more detail, a metering diaphragm 57 of variable opening cross section and an individual pressure compensator 58 arranged upstream of the metering diaphragm 57. The steering pressure is picked up downstream of the metering diaphragm 57 and is transmitted to the control junction 21 via a control line 59. In this case, a nonreturn valve 60, which blocks from the control junction 21 to the steering system, is located in the control line 59. The pressure compensator 58 is acted upon in the opening direction by a compression spring 61 and by the pressure downstream of the metering diaphragm 57. This pressure is picked up on the control line 59 upstream of the nonreturn valve 60. The pressure prevailing between the pressure compensator and the metering diaphragm 57 acts in the closing direction of the pressure compensator 58. The compression springs 48, 49 and 61 exert on the respective regulating piston of the pressure compensators 45, 46 and 58 a force such that, depending on the prestress of the compression springs, in the case of a pressure difference between the two pressures acting on the regulating piston which is in the range of between 5 bar and 20 bar, an equilibrium of forces prevails on the regulating piston of the pressure compensators.

The LUDV directional valves 12 are all formed essentially identically to the construction seen from FIG. 6. This is known per se from EP 0 566 449 B1, and therefore it will not be discussed in every detail here. Each LUDV directional valve 12 has a disk-shaped housing 65 possessing a continuous control bore 66 which lies in the disk plane and in which a control slide 67 is axially movable. The duct 23 crosses an inflow chamber 68 of the control bore 66 which is capable of being connected to an intermediate chamber 70 via control grooves 69 in a collar of the control slide 67, irrespective of the direction in which the control slide is moved from the middle position. The opening cross section between the control grooves 69 and the inflow chamber 68 or the intermediate chamber 70 constitutes a variable metering diaphragm of the LUDV directional valves 12 and it determines the speed at which a hydraulic consumer is moved. The intermediate chamber 70 is fluidically connected to a bore 71 which likewise lies in the plane of the housing 65 and runs perpendicularly to the control bore 66. Located in the bore 71, which is closed by means of a screw plug 72, is the regulating piston 73 of a pressure compensator 74 which controls an opening cross section between the bore 71 and a bridge duct 75, in each of the two branches of which is located a load-holding valve 76 and from which each branch leads to a further chamber 77 of the control bore 66. Each chamber 77 is capable of being connected via the control slide 67 to a consumer control chamber 78 which is connected to a consumer junction A or B. On the far side of each consumer control chamber 78 is also located an outflow control chamber 79 which is connected to the duct 24 passing perpendicularly through the housing disks 65.

The regulating piston 73 of the pressure compensator 74 is acted upon, with the effect of opening the connection between the intermediate chamber 70 and the bridge passage 75, by the pressure in the intermediate chamber 70, that is to say by the pressure downstream of the metering diaphragm which may be designated here by the same reference numeral as the control grooves 69. A pressure which prevails in a control space 81 between a regulating piston 73 and the screw plug 72 acts in the closing direction on said regulating piston. The duct 25 passes through this control chamber. Moreover, a compression spring 80, which is only slightly prestressed and the pressure equivalent of which is, for example, 0.5 bar, acts in the closing direction on the regulating piston 73. An equilibrium of forces on the regulating piston 73 thus prevails when the pressure downstream of the metering diaphragm 69 is 0.5 bar higher than the pressure in the rear control space 81. The regulating piston 73 is provided with an axial blind bore 82, which is open toward the intermediate chamber 70, and with a continuous transverse bore 83, into which the axial bore issues. The regulating piston 73 can run with the transverse bore 83 over the inner edge 84 of a shoulder in the bore 71 and thereby open a fluid path between the axial bore 82 and the rear control space 81 and consequently the duct 25. The fluid path is closed as long as the hydraulic consumer controlled by the directional valve is not the only one actuated and does not have the highest load pressure. The regulating piston 73 is then in a regulating position, in which it controls an opening cross section between the intermediate chamber 70 and the bridge passage 75 in such a way that the pressure in the intermediate chamber is higher than the pressure in the rear control space 81 by the amount of the pressure equivalent to the force of the compression spring 80. If the hydraulic consumer controlled by the directional valve according to FIG. 6 has the higher load pressure, the regulating piston 73 of the pressure compensator 74 completely opens the connection between the intermediate chamber 70 and the bridge passage 75 and then regulates the control edge 84. It may be considered in the same way as the regulating piston of a differential-pressure valve which sets in the rear control space 81 a pressure which is lower than the pressure in the intermediate chamber 70 and in the bridge passage 75 upstream of the load-holding valves 76 by the amount of the pressure equivalent to the force of the compression spring 80. This pressure is approximately the load pressure of the hydraulic consumer, since the closing spring of the load-holding valves used is only weak and also the pressure drop which is a control chamber 77 and a control chamber 78 is very small. Thus, the load pressure of that hydraulic consumer which has the highest load pressure is in each case signaled, via the regulating piston of one of the pressure compensators 74 contained in the directional valves 12, into the duct 25 and consequently into the rear control spaces on the other pressure compensators. The ducts 25 in the control blocks, the connecting line 27 and also the control line 58 between the steering system 55 and the control junction 21 of the control block 10 thus, as a whole, form a load-signaling line 85. In the rear control spaces 81 of the directional valves 12 prevails in each case a pressure which corresponds to the highest load pressure of all said hydraulic consumers, including the steering system 55. The nonreturn valve 60 ensures that the individual pressure compensator 58 of the steering system 55 is in each case acted upon by the steering pressure, even when this is not the highest load pressure. On the other hand, the nonreturn valve 60 makes it possible for the load pressure of the steering system 55 to pass into the ducts 25 when the steering system has the highest load pressure.

Depending on the circumstances, only the hydraulic pump 30, only the hydraulic pump 31 or both hydraulic pumps are to be used for supplying pressure medium to the various hydraulic consumers. The figures shown entail the fact that, when the steering system 55 is actuated, the pump 30 must always make available pressure medium which is under pressure. If the steering system is not actuated, a selection from the hydraulic pumps 30 and 31 can be made as a function of the quantity of pressure medium required. In order to make such selection possible, in the version according to FIG. 1 each inlet disk 13 and 14 contains a switching valve 90 and 91 which is capable of being actuated by the electromagnet 89 and, under the action of the compression spring, can assume a position of rest, in which that portion of the duct 25 which runs within the directional-valve disks 12 is shut off relative to that portion of the duct 25 which runs in the inlet disk. If one of the electromagnets 89 has changed over one of the switching valves 90 or 91, said two portions of the duct 25 are fluidically connected to one another. In this switching position, the corresponding bypass pressure compensator 45 or 46 is acted upon in the closing direction by the highest load pressure of all the hydraulic consumers actuated, including the steering system. The small-stream regulators 47 serve for relieving a control side of the pressure compensators 45 and 46 of pressure when no hydraulic consumer is actuated or when a switching valve 90 or 91 is in its position of rest.

The exemplary embodiment according to FIG. 1 will be considered below in various operating states, and, in this case, it is assumed that the compression springs 48 and 49 are prestressed to the same extent and both hydraulic pumps 30 and 31 are driven. When only the hydraulic steering system 55 is actuated, at least one of the switching valves 90 and 91 is in its position of rest, so that the load pressure of the steering system is signaled via the nonreturn valve 60 to the bypass pressure compensator 45, but not to the bypass pressure compensator 46. The pressure compensator 45 then throttles the outflow of pressure medium from the pump line 34 to the tank line 39 to an extent such that, in the pump line, a pressure builds up which is higher than the load pressure of the steering system by the amount of the pressure equivalent to the force of the compression spring 48. The pressure equivalent may be, for example, 20 bar. If only the steering system is actuated, the individual pressure compensator 58 is of no significance. It opens completely, so that a pressure medium stream caused by a pressure difference of 20 bar flows across the metering diaphragm 57. The pressure compensator 46 is completely relieved of pressure on its control side connected to the duct 25 in the inlet disk 14. Said pressure compensator throttles the outflow of pressure medium from the pump line 35 into the tank duct 24 only to an extent such that a pressure of 20 bar prevails in the pump duct 35 according to the force of the compression spring 49.

It may be that consumers 12 are only actuated in such a way that only little pressure medium is required. In this case, the switching valve 91 is left in its position of rest, while the switching valve 90 is brought by its electromagnet 89 into its passage position. The highest load pressure of all the hydraulic consumers actuated simultaneously via the directional valves 12 is then signaled to the spring side of the pressure compensator 45. The latter, in turn, throttles the outflow of pressure medium to an extent such that a pump pressure which is 20 bar above the highest load pressure is established in pump line 34.

If more pressure medium than the hydraulic pump 30 can convey is required, the switching valve 91 is brought into its passage position, while the switching valve 90 assumes its blocking position. The spring-side control side of the bypass pressure compensator 45 is then relieved of pressure, so that it throttles a pressure of 20 bar in the pump line 34. By contrast, the bypass pressure compensator 46 throttles to an extent such that the pressure in the pump line 35 is 20 bar above the highest load pressure of precisely all the hydraulic consumers actuated via the directional valves 12 of the two control blocks. If the pressure medium quantity required also exceeds the pressure medium quantity made available by the hydraulic pump 31, both switching valves 90 and 91 are brought into their passage position, both pressure compensators 45 and 46 are acted upon by the highest load pressure and a pressure which is 20 bar above the highest load pressure is built up in both pump lines 34 and 35. The hydraulic consumers actuated are then jointly supplied with pressure medium by both hydraulic pumps 30 and 31. When only one of the two pumps is used for the supply of pressure medium, the nonreturn valves 36 and 37 prevent the conveyed pressure medium from flowing out to the tank via the respective bypass pressure compensator of the other hydraulic pump.

Figure 1:
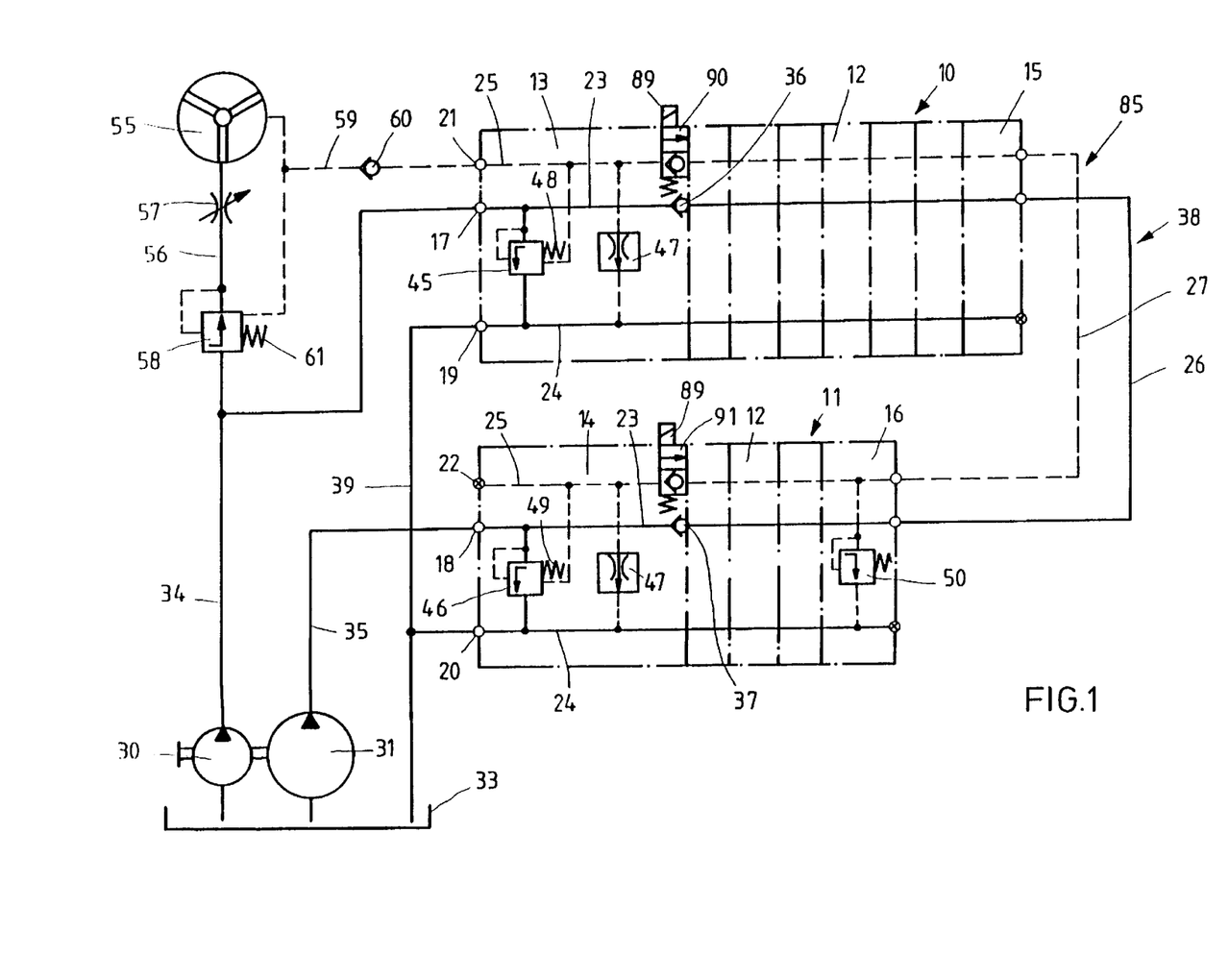
FIG. 1 shows the first exemplary embodiment which has two fixed-displacement pumps of different size with bypass pressure compensators, a plurality of LUDV consumers, which can be supplied jointly with pressure medium by only one hydraulic pump or by both hydraulic pumps, and an LS consumer which can be supplied with pressure medium by only the one hydraulic pump, for the selection of the supplying hydraulic pump each bypass pressure compensator being assigned a switching valve by which a control side of the corresponding bypass pressure compensator can be shut off relative to the load-signaling line of the LUDV consumers.
Figure 2:
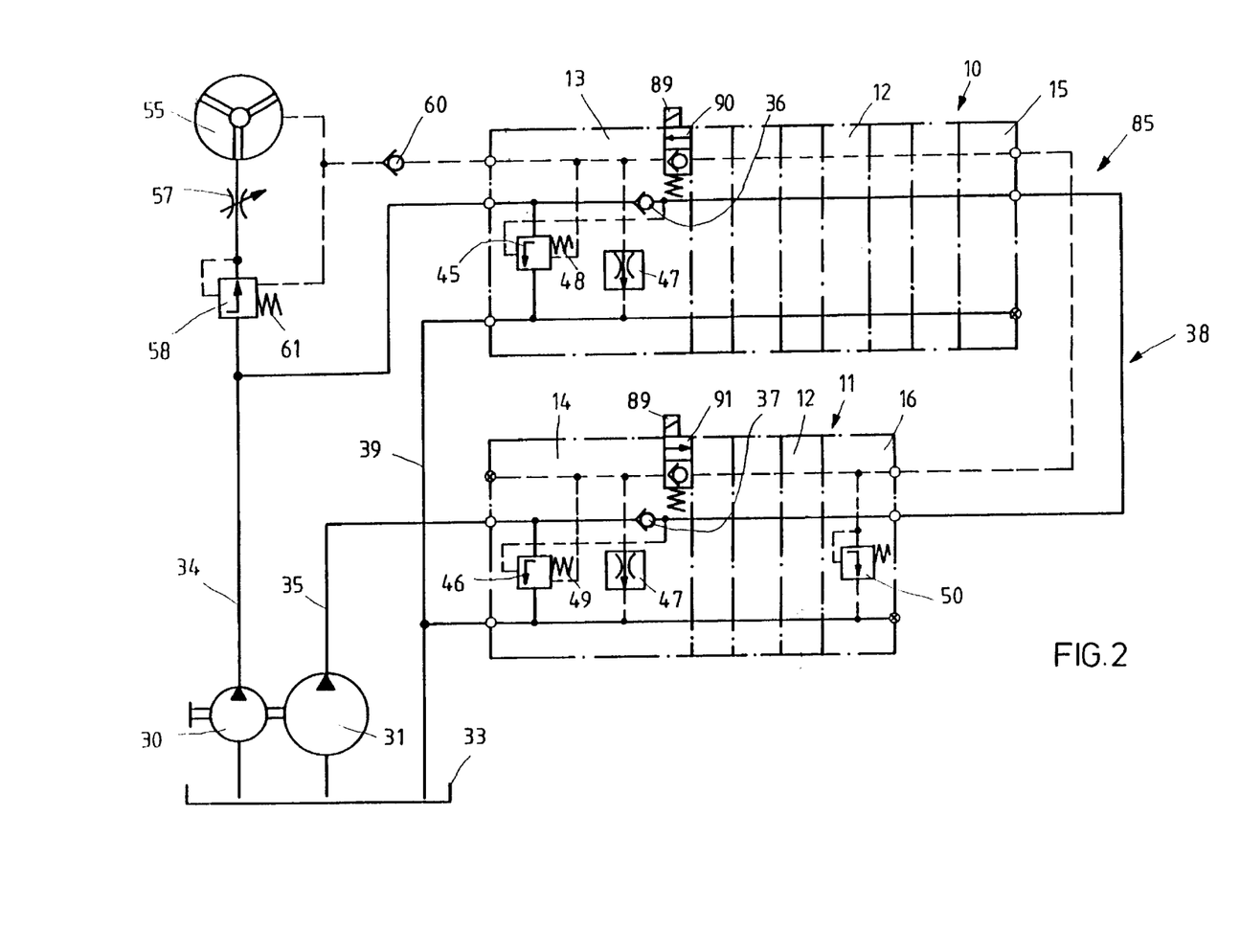
FIG. 2 shows a second exemplary embodiment which differs from the first exemplary embodiment only in a different type of action of pressure on the bypass pressure compensators.

The version according to FIG. 2 differs from that according to FIG. 1 only in that the control side of the pressure compensators 45 and 46 which is remote from the spring is connected to the respective duct 23 and therefore to the common inflow line 38 not upstream, that is to say within the inlet disk 13 or 14, but downstream of the nonreturn valves. When the hydraulic consumers are supplied with pressure medium by only one of the two hydraulic pumps 30, 31 and the spring-side control side of one of the pressure compensators 45 and 46 is relieved so as to bring this about, the inflow pressure prevailing in the common inflow line 38 and lying 20 bar above the highest load pressure then opens the one pressure compensator completely, so that the pressure medium conveyed by the one hydraulic pump not being used can flow back, without any throttling, out of the pump line to the tank. The losses of non-utilizable energy are then particularly low.

In the two exemplary embodiments according to FIGS. 1 and 2, initially no immediately obvious measures are taken in order to ensure a preferred supply of pressure medium to the steering system 55. However, by an appropriate choice of the prestress of the compression spring 61 of the individual pressure compensator 58 of the steering system and of the compression springs 80 of the LUDV pressure compensators 74 in the directional valves 12, a preferred supply of pressure medium to the steering system can be brought about. For this purpose, it is necessary merely to make the pressure equivalent to the springs 80 exactly the same as that of compression spring 61. For example, the compression springs may be prestressed to a pressure equivalent of 5 bar. This means that the individual pressure compensator 58 maintains a pressure difference of 5 bar across the metering diaphragm 57. This also means that the pressure compensators 74 in each case throttle the stream of pressure medium to a hydraulic consumer to an extent such that, in the intermediate chamber 70 of the directional valve shown in FIG. 6, a pressure prevails which is 5 bar above the pressure in the rear control spaces 81. In an under-saturation situation, the pump pressure in the pump line 34 falls below the level lying 20 bar above the highest load pressure by virtue of the prestress of the compression springs 48 and 49 of the bypass pressure compensators 45 and 46 and, in an extreme case, is only 5 bar higher than this level. There is then no longer any pressure difference across the metering diaphragms 69, so that the entire pressure medium quantity conveyed by the hydraulic pump 30 flows to the steering system. If the pump pressure is between the two extreme values, there is still a pressure difference across the metering diaphragm 69, but it is in each case so low that the steering system receives sufficient pressure medium.

Figure 3:
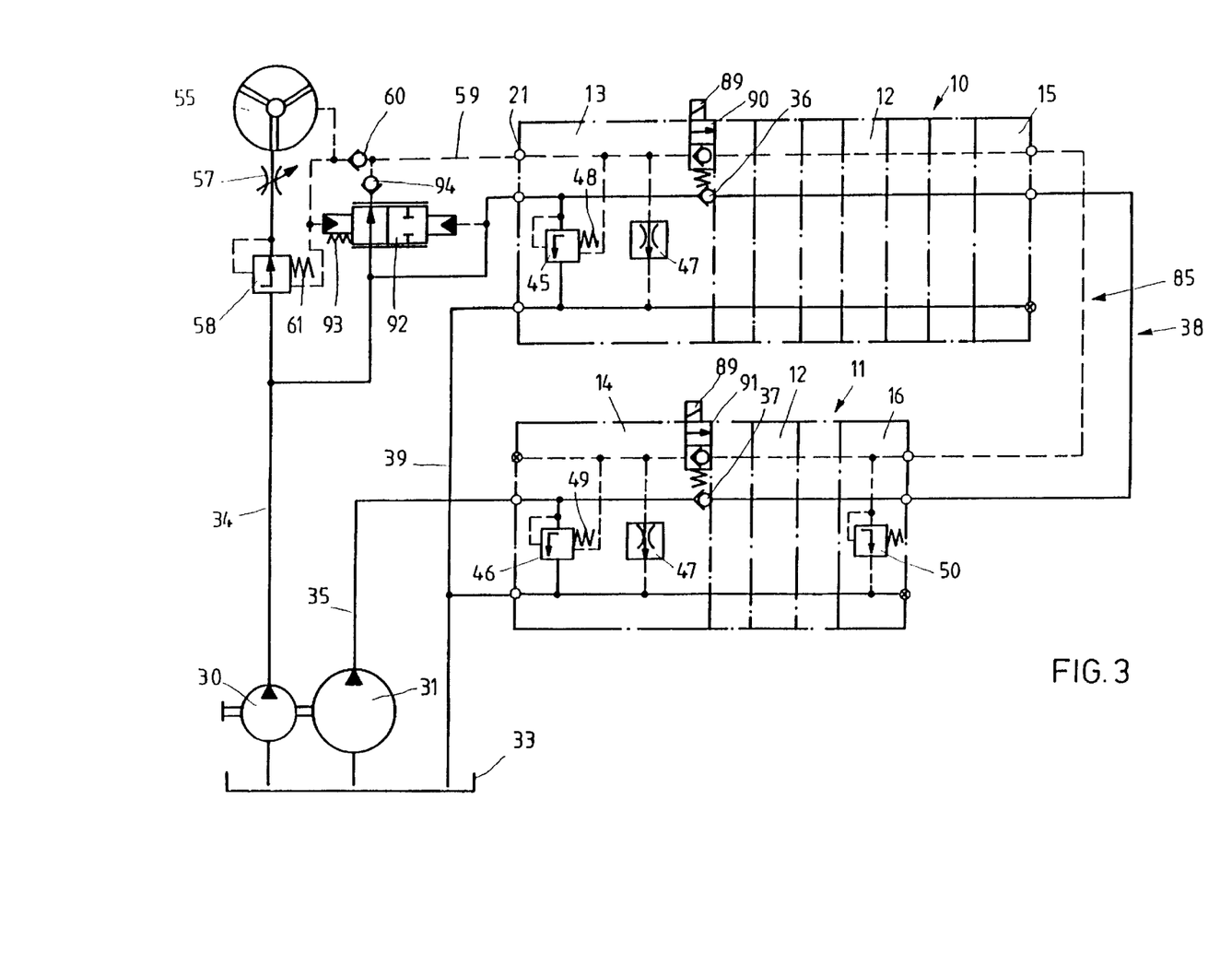
FIG. 3 shows a third exemplary embodiment in which the priority of an LS consumer is ensured by raising the pressure on the rear side of the LUDV pressure compensators of the other consumers and which is otherwise identical to the first exemplary embodiment.

In normal operation, when the hydraulic pumps convey sufficient pressure medium, the way described of ensuring a preferred supply of pressure medium to the steering system entails pressure losses at the pressure compensator 58 and at the pressure compensators 74. FIG. 3 shows a hydraulic control arrangement which, with the exception of the measures for the preferred supply of pressure medium to the steering system, is identical to the control arrangements shown in FIG. 1 and FIG. 2. The priority of the steering system 55 in the supply of pressure medium is in this case obtained by means of an additional priority valve 92 which is formed as a 2/2-way proportional valve and the incorporation of which into the control arrangement is known per se from DE 197 03 997 A1, FIG. 3. The valve 92 can close or to a greater or lesser extent open a flow path which is between the pump line 34 and a point located downstream of the nonreturn valve 60, on the control line 59 between the steering system 55 and the junction 21 of the inlet disk 13 of the control block 10. Said valve is in this case acted upon in the opening direction by the steering pressure and by a compression spring 93. The pressure equivalent of the compression spring 93 is lower than that of the compression springs 48 of the pressure compensator 45 and of the compression spring 61 of the pressure compensator 58. The priority valve 92 is acted upon in the closing direction by the pressure in the pump line 34. Between the outlet of the priority valve 92 and the line 59 is also inserted a nonreturn valve 94 which opens toward the latter. An unbalance of forces occurs at the priority valve 92 whenever the pump pressure of the line 34 is no longer above the steering pressure by the amount of the pressure equivalent of the compression spring 93. The priority valve 92 then opens the flow path between the pump line 34 and the control line 59, so that the pressure increases in the latter and consequently in the rear control spaces 81 of the pressure compensators 74. The pressure compensators are thereby adjusted in the "closing" direction, until the force which the pressure in the intermediate chamber 70 exerts on the regulating piston 73 can again maintain an equilibrium with the force exerted by the pressure in the control space 81, plus the spring force, that is to say until the pressure in the intermediate chamber 70 is again approximately equal to the pressure in the rear control space 81. Then, however, the pressure difference across the metering diaphragms 89 has decreased, so that less pressure medium flows via these to the hydraulic consumers capable of being controlled by the directional valves 12 and the steering system receives sufficient pressure medium. The nonreturn valve 94 prevents a flow of pressure medium from the steering system 55 via the nonreturn valve 60 into the pump line 34 when, for example at the commencement of actuation, the pressure in the pump line is not yet above the load pressure of the steering system.

The control arrangement according to FIG. 4 is identical to the control arrangement according to FIG. 2 in terms of the connection of the control sides of the pressure compensators 45 and 46. The switching valves 90 and 91 shown in FIG. 2 are absent. Instead, the ducts 25 pass through the entire control block 10 and 11 without the possibility of any interruption. In contrast to the version according to FIG. 2, then, the prestress of the compression spring 49 of the bypass pressure compensator 46 can be changed. For this purpose, this pressure compensator is assigned an electromagnet 95 which can displace a spring plate 96 axially between two stops. In the position of rest of the electromagnet 95, the compression spring 49 is relaxed to an extent such that its pressure equivalent is lower than that of the compression spring 48 of the bypass pressure compensator 45. For example, this pressure equivalent may be 18 bar, while the pressure equivalent of the compression spring 48 may be 20 bar. If the electromagnet 95 is then excited, the compression spring 49 is prestressed to a pressure equivalent which is higher than the pressure equivalent of the compression spring 48. It may then amount, for example, to 22 bar.

It may be assumed, then, that the electromagnet 95 is switched off and the hydraulic consumer is actuated via a directional valve 12 with a load pressure of, for example, 100 bar. The two bypass pressure compensators 45 and 46 are acted upon by this pressure in the closing direction, so that a pressure builds up in the pump lines 34 and 35. This pressure finally becomes 18 bar higher than the highest load pressure prevailing in the load-signaling line 85. The bypass pressure compensator 46, the compression spring of which has a pressure equivalent of 18 bar, with the electromagnet switched off, then commences to regulate. If more pressure medium is used up then the hydraulic pump 30 can deliver, the bypass pressure compensator 45 thereafter remains closed and both hydraulic pumps convey together into the flow line 38. The bypass pressure compensator 46 regulates the pressure difference between the highest load pressure and the pump pressure to the level of 18 bar. If, by contrast, the pressure medium quantity conveyed by the hydraulic pump 30 is sufficient for supplying pressure medium to the hydraulic consumers, the pump pressure rises more than 18 bar above the highest load pressure. The bypass pressure compensator 46 is thereby opened completely and the hydraulic pump 31 conveys in circulation to the tank. By contrast, the bypass pressure compensator 45 sets a pump pressure which is 20 bar above the highest load pressure. If the pressure medium quantity conveyed by the hydraulic pump 30 is not sufficient, but that of the hydraulic pump 31 is sufficient for supplying pressure medium to the hydraulic consumers, the electromagnet 95 is excited and the pressure equivalent of the compression spring 49 is set to 22 bar. The bypass pressure compensator 45 then opens completely, so that the hydraulic pump 30 conveys in circulation and the hydraulic consumers are supplied with pressure medium by the hydraulic pump 31.

In the case of steering actuation, the electromagnet 95 must be de-excited, so that pressure can build up on the pump line 34.

The version according to FIG. 5 corresponds, in terms of the connection of the control side of the two pressure compensators 45 and 46, to the versions shown in FIGS. 2 and 4. In this case, in contrast to the version according to FIG. 4, the compression spring 49 of the bypass pressure compensator 46 is prestressed permanently to a pressure equivalent of, for example, 18 bar. The compression spring 48 of the bypass pressure compensator 45 is, in turn, prestressed to 20 bar. Whereas, in the version according to FIG. 2, two switching valves 90 and 91 are present, which are completely absent in the version according to FIG. 4, the control arrangement according to FIG. 5 possesses only the switching valve 90 which, as in the version according to FIG. 2, is located in the inlet disk 13 of the control block 10. This switching valve 90 can shut off the load-signaling line 85 relative to the spring-side control side of the bypass pressure compensator 45, so that the highest load pressure of the hydraulic consumers actuated by the directional valves 12 is not signaled to the bypass pressure compensator 45, but, instead, its spring-side control side is relieved to the tank via the small-stream regulator 47. When the switching valve 90 is in its passage position and the hydraulic pump 30 delivers sufficient pressure medium to supply the hydraulic consumers, the hydraulic control arrangement according to FIG. 5 operates in exactly the same way as that according to FIG. 4 when the electromagnet 95 of the latter is switched off. The bypass pressure compensator 46 is then completely open, and the bypass pressure compensator 45 sets, in the pump line 34 and the inflow line 38, a pressure which is 20 bar above the highest load pressure of the hydraulic consumers just actuated. Only when the pressure medium quantity conveyed by the hydraulic pump 30 is no longer sufficient, even with the bypass pressure compensator 45 closed, to maintain a pump pressure which is 20 bar above the highest load pressure does the pump pressure fall to 18 bar above the highest load pressure, so that the bypass pressure compensator 46 begins to regulate and both hydraulic pumps 30 and 31 then convey pressure medium into the inflow line 38. If only the hydraulic pump 31 is to convey pressure medium to the hydraulic consumers, the switching valve 90 assumes its position of rest, in which the spring-side control side of the bypass pressure compensator 45 is relieved to the tank and the pressure in the inflow line 38 can open this pressure compensator completely. The hydraulic pump 30 then conveys in circulation to the tank. By contrast, the bypass pressure compensator 46 in each case allows so much of the pressure medium quantity conveyed by the hydraulic pump 31 to flow out to the tank that a pressure which is 18 bar above the highest load pressure is established in the inflow line.

I claim:

1. A hydraulic control arrangement for demand-feed-regulated supply of pressure medium to at least one hydraulic consumer comprising proportionally adjustable directional valves (12) for controlling the at least one hydraulic consumer, with a first hydraulic pump (30) and a second hydraulic pump (31) which are capable of being driven jointly and by which pressure medium is conveyable in a quantity corresponding to demand into a common inflow line (26) leading to the directional valve (12), a first demand-feed regulator (45) which is coordinated to the first hydraulic pump (30) and a second demand-feed regulator (46) which is coordinated to the second hydraulic pump (31), said two demand-feed regulator (45, 46) being capable of being acted upon, with effect of increasing pressure medium quantity discharged into the inflow line (26) by the corresponding hydraulic pump (30, 31), by a spring (48, 49) and, on a first active surface, by pressure in a load-signaling line (85) and, with effect of reducing the pressure medium quantity discharged into the inflow line (26) by the corresponding hydraulic pump (30, 31), on a second active surface, by a pump pressure, and a nonreturn valve (36) arranged between the first hydraulic pump (30) and the inflow line (26) and opening toward the latter, a nonreturn valve (37) opening toward the inflow line (26) is also arranged between the second hydraulic pump (31) and said inflow line, and means (90, 91, 95, 96) by which action of force upon the demand-feed regulators (45, 46) are changable such that the at least one hydraulic consumer is suppliable with pressure medium both solely by the first hydraulic pump (30) and solely by the second hydraulic pump (31).

2. The hydraulic control arrangement as claimed in claim 1, wherein a control space on the second active surface of a demand-feed regulator (45, 46) is connected to the inflow line (26), and on at least one demand-feed regulator (46), the spring (49) is adjustable such that pressure difference corresponding to force of the spring (48) on the first demand-feed regulator (45) is, on one hand, greater and, on other hand, lower than pressure difference corresponding to force of the spring (49) on the second demand-feed regulator (46).

3. The hydraulic control arrangement as claimed in claim 1, wherein a control space on the second active surface of the second demand-feed regulator (46) is connected to the inflow line (26), the load-signaling line (85) can be shut off relative to the first demand-feed regulator (45) of a switching valve (90), in blocking position of the switching valve (90), the first active surface of the first demand-feed regulator (45) is relievable of pressure, and the spring (48) of the first demand-feed regulator (45) is set at a higher pressure difference than the spring (49) of the second demand-feed regulator (46).

4. The hydraulic control arrangement as claimed in claim 1, wherein the load-signaling line (85) can be shut off relative to the first demand-feed regulator (45) by a first switching valve (90) and relative to the second demand-feed regulator (46) by a second switching valve (91), and in blocking position of a switching valve (90, 91), the first active surface of the corresponding demand-feed regulator (45, 46) is relievable of pressure.

5. The hydraulic control arrangement as claimed in claim 4, wherein a control space on the second active surface of a demand-feed regulator (45, 46) is connected, upstream of a corresponding nonreturn valve (36, 37), to a flow path running between the corresponding hydraulic pump (30, 31) and the nonreturn valve (36, 37).

6. The hydraulic control arrangement as claimed in claim 4, wherein a control space on the second active surface of a demand-feed regulator (45, 46) is connected to the inflow line (26).

7. The hydraulic control arrangement as claimed in claim 1, wherein the two hydraulic pumps (30, 31) are of different size relating to stroke volume.

8. The hydraulic control arrangement as claimed in claim 1, wherein there is a further hydraulic consumer (55) which is suppliable with pressure medium only by one hydraulic pump (30) from a point upstream of one nonreturn valve (36).

9. The hydraulic control arrangement as claimed in claim 8, wherein the further hydraulic consumer (55) is a hydraulic steering system.

10. The hydraulic control arrangement as claimed in claim 8, wherein the pressure medium is feedable to the further hydraulic consumer (55) via a first metering diaphragm (57), by which a constant pressure difference is settable by an upstream first pressure compensator (58), pressure medium is feedable to the other hydraulic consumers via second metering diaphragms (69) followed in each case by a second pressure compensator (74) with a regulating piston (73) which is acted upon in closing direction by pressure prevailing in the load-signaling line (85) and by a closing spring (80) and in opening direction by the pressure downstream of the respective second metering diaphragm (69), and the closing springs (80) exert on the regulating pistons (73) a force, a pressure equivalent of which is approximately equal to pressure difference set across the first metering diaphragm (57) by the first pressure compensator (58).

11. The hydraulic control arrangement as claimed in claim 8, wherein the pressure medium is feedable to the further hydraulic consumer (55) via a first metering diaphragm (57), via which a constant pressure difference is settable by an upstream first pressure compensator (58), a pressure medium is feedable to the the at least one hydraulic consumer via second metering diaphragm (69) followed by a second pressure compensator (74) which is acted upon in closing direction by the pressure prevailing in the load-signaling line (85) and in the opening direction by the pressure downstream of the respective second metering diaphragm (89), and there is a valve (92) which is controlable by the pressure drop across the first metering diaphragm (57) and via which pressure in the load-signaling line (85) is increasable by pressure medium above a highest load pressure being fed in.

12. The hydraulic control arrangement as claimed in claim 1, wherein one hydraulic pump (30, 31) has a constant stroke volume, and the demand-feed regulator (45, 46) coordinated to this hydraulic pump (30, 31) is a bypass pressure compensator, by which a through-flow cross section between a flow path running between the hydraulic pump (30, 31) and a corresponding nonreturn valve (36, 37) and an outflow line (39) leading to a tank (33) can be controlled.

13. The hydraulic control arrangement as claimed in claim 1, wherein one hydraulic pump has a variable stroke volume, and the demand-feed regulator coordinated to this hydraulic pump is a pump-regulating valve controlling adjustment of the hydraulic pump.

14. The hydraulic control arrangement as claimed in claim 1, further comprising a flow valve (47) provided to relieve the first active surface of a demand-feed regulator (45, 46) of pressure, said flow valve (47) is arranged between a pressure space adjacent to the first active surface and an outflow line (24) to a tank (33).

15. The hydraulic control arrangement as claimed in claim 14, wherein the flow valve (47) is a flow-regulating valve.

* * * * *